(12) United States Patent
Stickney

(10) Patent No.: US 6,425,584 B1
(45) Date of Patent: Jul. 30, 2002

(54) SLIDING JAW CHUCK ASSEMBLY

(75) Inventor: William R. Stickney, Honor, MI (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 09/654,127

(22) Filed: Sep. 1, 2000

(51) Int. Cl.$^7$ ................................................ B23B 31/14
(52) U.S. Cl. ........................ 279/119; 279/130; 279/131
(58) Field of Search ............................... 279/110, 119, 279/118, 123, 129, 130, 131

(56) References Cited

U.S. PATENT DOCUMENTS

| | | | | |
|---|---|---|---|---|
| 346,133 A | * | 7/1886 | Singer | 279/123 |
| 1,999,032 A | * | 4/1935 | Burger et al. | 279/119 |
| 2,794,648 A | * | 6/1957 | Sampson | 279/119 |
| 2,867,443 A | * | 8/1959 | Swanson | 279/119 |
| 3,938,815 A | * | 2/1976 | Geppert | 279/123 |
| 4,422,655 A | | 12/1983 | Waite | |
| 4,647,051 A | | 3/1987 | Stone et al. | |
| 4,688,810 A | | 8/1987 | Waite | |
| 4,692,104 A | * | 9/1987 | Hansen | 418/61 R |
| 5,052,700 A | | 10/1991 | Howard et al. | |
| 5,143,687 A | | 9/1992 | Howard et al. | |
| 6,017,266 A | * | 1/2000 | Tabachenko | 451/385 |

* cited by examiner

Primary Examiner—Daniel W. Howell
(74) Attorney, Agent, or Firm—Harness, Dickey & Pierce, P.L.C.

(57) ABSTRACT

A sliding jaw chuck assembly for heavy duty applications has a plurality of radially slidable jaw mounts each actuated by an L-shaped lever mounted for rocking movement about a supporting trunion. The chuck assembly includes a sealed housing subassembly which encloses a sliding jaw subassembly. The sliding jaw subassembly utilizes a plurality of master slides, each slide having a jaw support portion and a counterweight support portion interconnected by a bridge. A gripping jaw is releasably secured to the jaw support portion and a counterweight is releasably secured to the counterweight supporting portion.

23 Claims, 4 Drawing Sheets

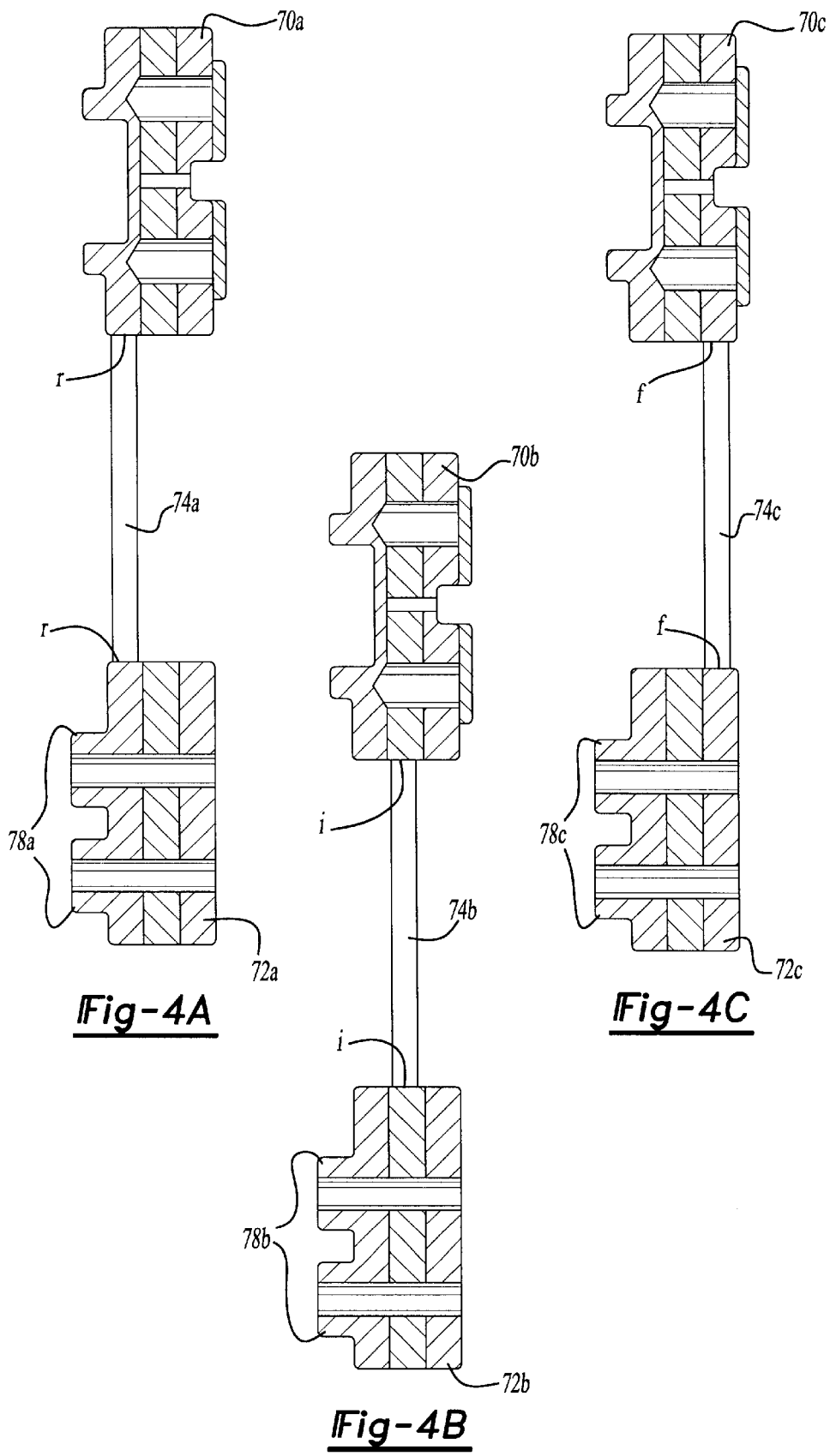

SLIDING JAW CHUCK ASSEMBLY

FIELD OF THE INVENTION

This invention relates generally to a workholding chuck assembly for use in high speed machining applications, and more specifically to a sliding jaw chuck assembly including a plurality of radially positionable master slides having a jaw support located at one end of each master slide and a counter balance located at the opposite end therefrom. A centrally-located axially-movable draw spool is operably coupled to each master slide by a lever such that the lever rocks about a pin as the draw spool moves to position the jaw supports radially inwardly and outwardly. The invention further provides a sealed assembly which prevents entry of debris into the chuck cavity and provides a self-lubricating assembly.

BACKGROUND OF THE INVENTION

Chucks of the type to which this invention is directed include a number of internal moving parts which serve to open and close the gripping jaws. The smooth operation of these parts is most important to assure that there is a positive clamping of the workpiece when the jaws are closed, and further that each of the jaws applies equal pressure against the workpiece to prevent distortion and possible eccentric location of the workpiece.

There has been a recent trend to require sliding jaw chucks to operate at significantly higher rotational speeds. As such, the rotational balance of the chuck and the workpiece held within the chuck become increasingly important. At the speeds at which many chucks are used in modern manufacturing processes, even slight eccentricities or out of balance is unwanted. For example, an imbalance may cause improper machining requiring rejection of the workpiece. Alternately, an imbalance may create a change in the grip force as a result of the centrifugal force created by the rotation of the jaw supports. Thus, it is desirable to provide a chuck which maintains a proper balance and constant gripping force independent of rotational speed and which is readily adjustable to ensure concentric alignment with the machine tool.

Conventional sliding jaw chucks do not provide a completely sealed environment for the sliding jaw assembly. As such, debris may enter the chuck cavity causing faulty operation and an increased frequency of maintenance. Furthermore, it is difficult to assure lubrication of all critical points in the chuck actuating system. Thus, it is desirable to provide a chuck having a closed, oil-filled cavity.

SUMMARY OF THE INVENTION

The present invention provides a fully-sealed, self-lubricating closed center countercentrifugal sliding jaw chuck assembly for use in either ID or OD chucking applications. The chuck assembly includes a sealed housing and a sliding jaw assembly having a plurality of master slides supported in the housing for radial positioning. Each of the master slides has a jaw support formed on one end and a counterweight support formed on the opposite end. The counterweights function to generate centrifugal forces equal in magnitude but opposite in direction to the centrifugal forces associated with jaw mechanism. A draw spool is operably coupled to the master slide through a pivoting lever assembly which radially positions the master slides in response to axial movement of the draw spool. A plurality of the slide covers are disposed over the jaw support to maintain a lubricant tight seal, while adapting the chuck assembly to receive a variety of gripping jaw such that the chuck assembly of the present invention may be readily adaptable for a wide range of applications.

BRIEF DESCRIPTION OF THE DRAWINGS

FIGS. 4A–4C are cross sectional views illustrating three configurations of the master slide of a sliding jaw chuck illustrated in FIG. 1.

DETAILED DESCRIPTION OF THE PREFERRED EMBODIMENT

Figure 1:
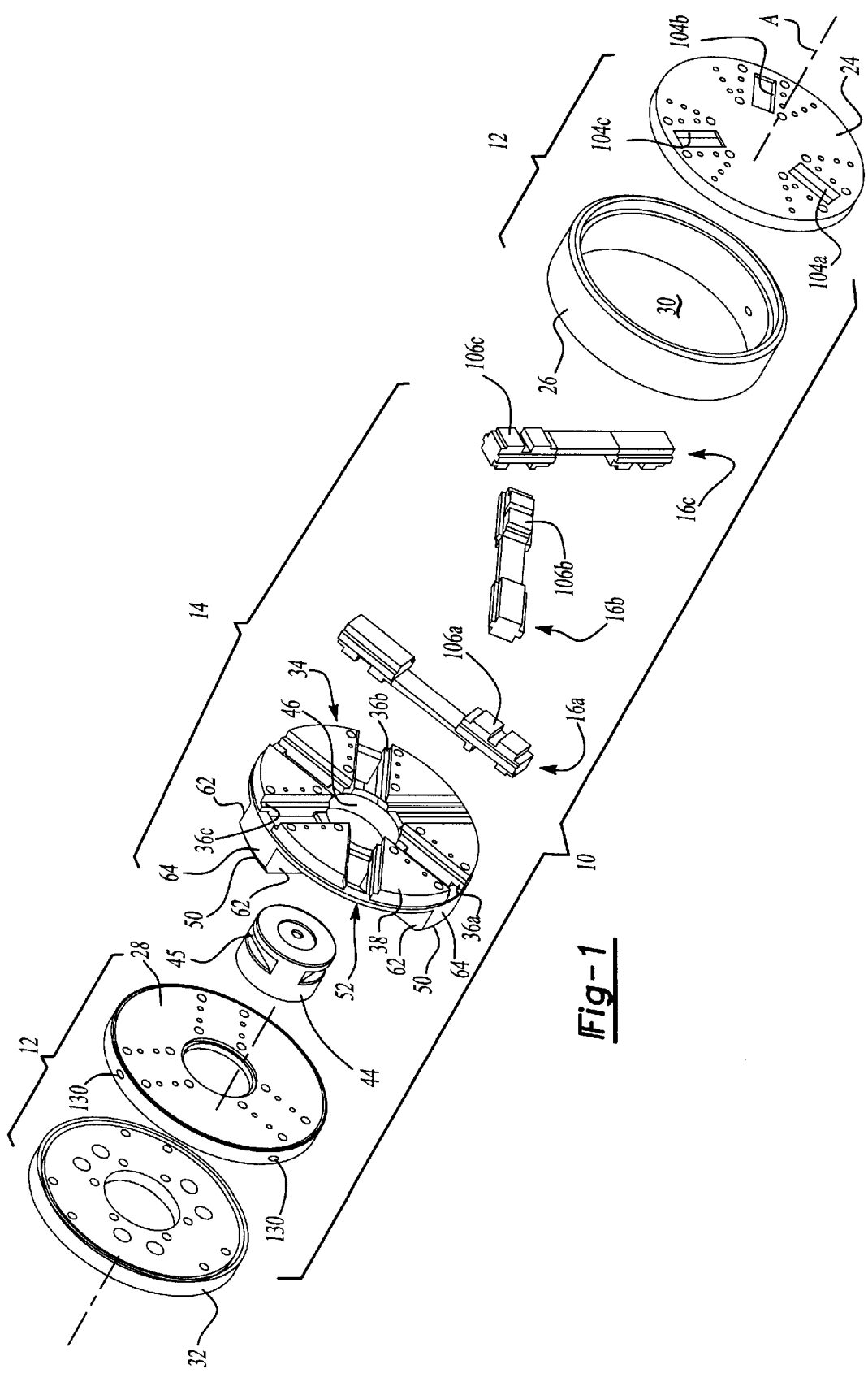
FIG. 1 is an exploded perspective view of the main components of a preferred embodiment of a sliding jaw chuck in accordance with the present invention.

With reference now to the drawings, a sliding jaw chuck assembly 10 includes a housing subassembly 12 having a sliding jaw subassembly 14 mounted thereon which includes master slides 16a, 16b and 16c supported for sliding motion in a radial direction within housing subassembly 12. The chuck assembly 10, as illustrated herein, has three master slides but for the purpose of this invention, the chuck assembly 10 may have additional slides as may be considered necessary. A gripping jaw 22 is releasably secured to one end of master slides 16 for engaging a part to be secured by the chuck assembly 10 for machining. The gripping jaws 22 are conventional and may be adapted to the shape of the particular part to be machined. The master slides 16 and the associated gripping jaws 22 are designed to move a given distance in a radial direction as determined by the particular application for purposes of causing the gripping jaws to either engage or release a workpiece to be machined. For example, in ID chucking applications, the gripping jaws 22 are configured to move radially outward from a released position to an engaged position for grasping the inner surface of a workpiece. Alternatively, in OD chucking applications, the gripping jaws 22 are configured to move radially inward from a released position to an engaged position for grasping by the outer surface of a workpiece.

Housing subassembly 12 includes a front cover plate 24, an outer ring 26 and a rear cover plate 28 which are assembled to define an interior volume 30 which encloses the sliding jaw subassembly 14. A machine adapter plate 32 is secured to the rear cover plate 28. The machine adapter plate 32 is configured for a particular machining apparatus. However, one skilled in the art will readily recognize that the machine adapter plate 32 is readily modified or replaced such that the sliding jaw chuck assembly 10 may be configured for use with a wide variety of machining apparatuses.

The sliding jaw subassembly 14 includes a body 34 having a plurality of radially extending slots 36 formed in its forward face 38. The sliding jaw subassembly 14 further includes a lever actuator mechanism 40 (illustrated in FIG. 3) for transmitting axial movement of a drawbar 42 associated with a given machining apparatus. The lever actuator mechanism 40 includes a draw spool 44 concentrically located within a central bore 46 formed through the body 34, and a plurality of levers 48 pivotally supported on trunnions 50 formed on the body 34 and extending from a rear face 52 thereof. Each of the levers 48 is generally L-shaped having a first or axial leg 54 projecting forwardly and received within a pocket 56 formed in a rear face 58 of each master slide 16. A second or radial leg 60 projects inwardly and is received within a slot 45 formed in draw spool 44. In this manner, the levers 48 function as a rocker mechanism to convert axial movement of the draw spool 44 to radial movement of the master slides 16.

Trunnions 50 include a pair of sidewalls 62 extending rearwardly from the rear face 52 of the body 34 and an end wall 64 interconnecting the sidewalls 62. An aperture 66 is formed through the sidewalls 62 and receives a fixture pin 68 for pivotally supporting the levers 48 on the body 34.

With particular reference now to FIGS. 4A–4C, the master slides 16a–16c will be described in further detail. The master slides 16a, 16b, 16c are generally similar in configuration having a jaw support portion 70a, 70b, 70c and a counterweight support portion 72a, 72b, 72c interconnected by a bridge portion 74a, 74b, 74c. As can be determined from a comparison of FIGS. 4A–4C, the jaw support portion 70 and counterweight support portion 72 for each of the master slides 16 are identical. However, the bridge portions 74 are interconnected in an axially offset manner such that the bridge portions 74 may be arranged in a stacked relationship through a central longitudinal axis A of the sliding jaw chuck assembly 10 while at the same time maintaining adequate clearance for allowing radially sliding motion of the master slides 16. Specifically, the bridge portion 70a of master slide 16a intersects the jaw support portion 74a and counterweight support portion 72a at a rearward location r; the bridge portion 74b of master slide 16b intersects the jaw support portion 70b and counterweight support portion 72b at an intermediate location i; and the bridge portion 74c of master slide 16c intersects the jaw support portion 70c and counterweight support portion 72c at a forward location f.

The sliding jaw subassembly 14, and particularly the configuration of master slides 16 provide for the use of a counterweight 76 secured to the counterweight support portion 72 on the master slide 16 opposite the jaw support portion 70. In this manner, the counterweight 76 is located within the sliding jaw chuck assembly 10 radially opposite from its associated jaw mechanism. As best seen in FIGS. 4A–4C, the counterweight support portion 72 has a boss 78 extending therefrom which cooperates with a detail 80 formed in the counterweight 76. The counterweights 76 are releasably secured to the counterweight support portion 72 by threaded fasteners or other suitable means. The counterweight 76 is designed such that the mass of the counterweight 76 and the counterweight support portion 72 balances the mass of the gripping jaw 22, the lever actuation mechanism 40 and the jaw support portion 70. In this manner, one skilled in the art will readily recognize that the counterweights of the present invention may be replaced or modified to provide an adequate balancing force with respect to the sliding jaw subassembly 14.

With reference again to FIGS. 1 and 2, the housing subassembly 12 defines an enclosure which is adequately sealed to retain a lubricant such as a 90 W gear lube therein for lubricating the sliding jaw subassembly 14. In this manner, various seals are utilized to ensure an adequately sealed enclosure. Specifically, a circumferential groove 82 is formed in an annular flange 84 of front cover plate 24. The groove 82 is adapted to receive an O-ring 86 therein. A forward edge of the outer ring 26 has a detail 88 formed thereon which is adapted to be received within the groove 82 formed on cover plate 24 and to compress the O-ring 86, thereby providing a lubricant-tight seal. Similarly, the forward face 90 of the rear cover plate 28 has a circumferential groove 92 formed therein which is adapted to receive an O-ring 94. A rearward edge of the outer ring 26 has a detail 96 which is adapted to be received within the groove 92 to compress the O-ring 94, thereby providing a lubricant-tight seal between the outer ring 26 and the rear cover plate 28. A circumferential groove 98 is formed within the central bore 46 of the rear cover plate 28 and is adapted to receive an O-ring 100 therein. An annular surface 102 formed on the draw spool 44 engages the O-ring 100 to provide a fluid tight seal between the draw spool 44 and the rear cover plate 28.

Figure 2:
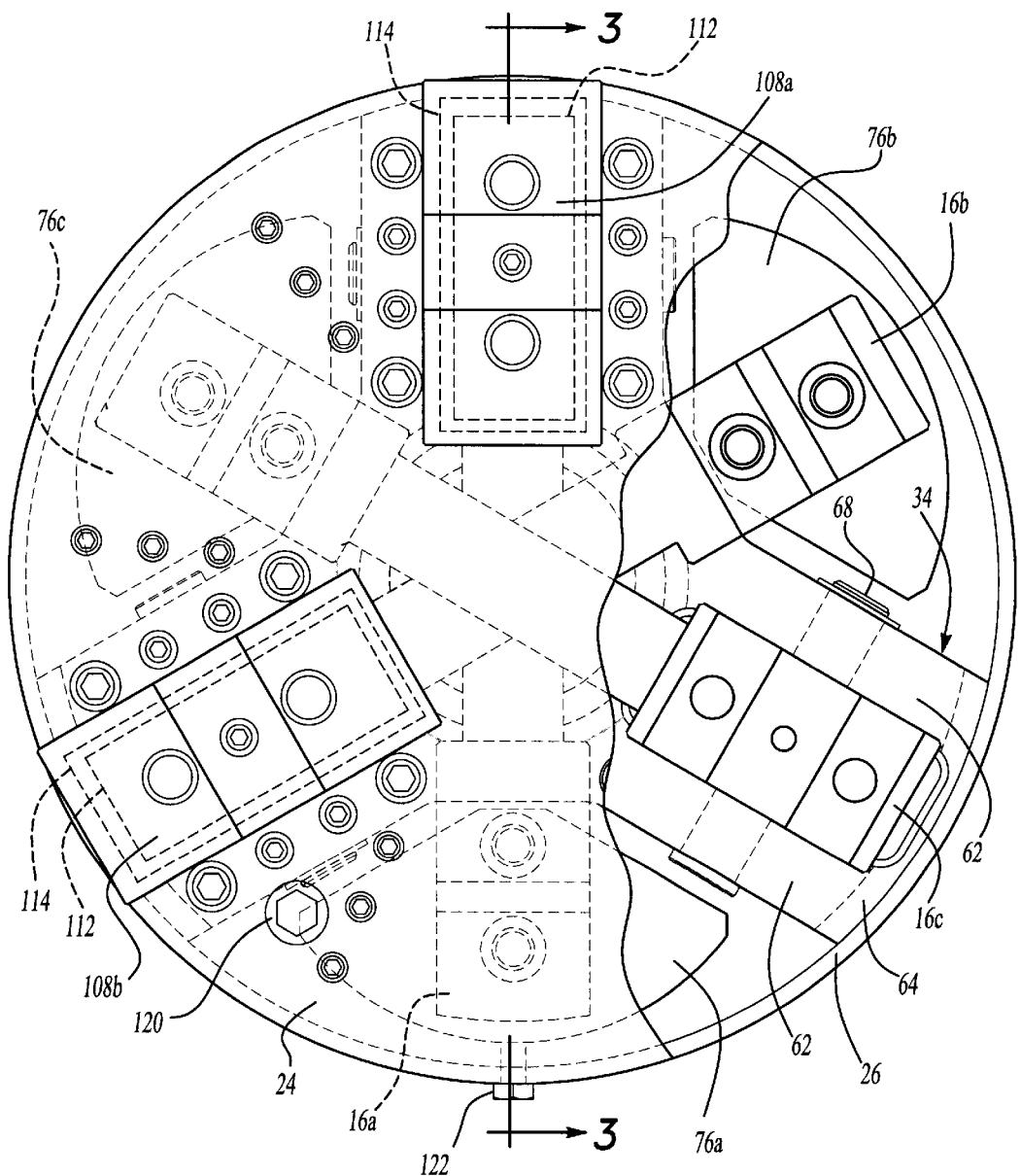
FIG. 2 is a front partially broken view of the sliding jaw chuck illustrated in FIG. 1.
Figure 3:
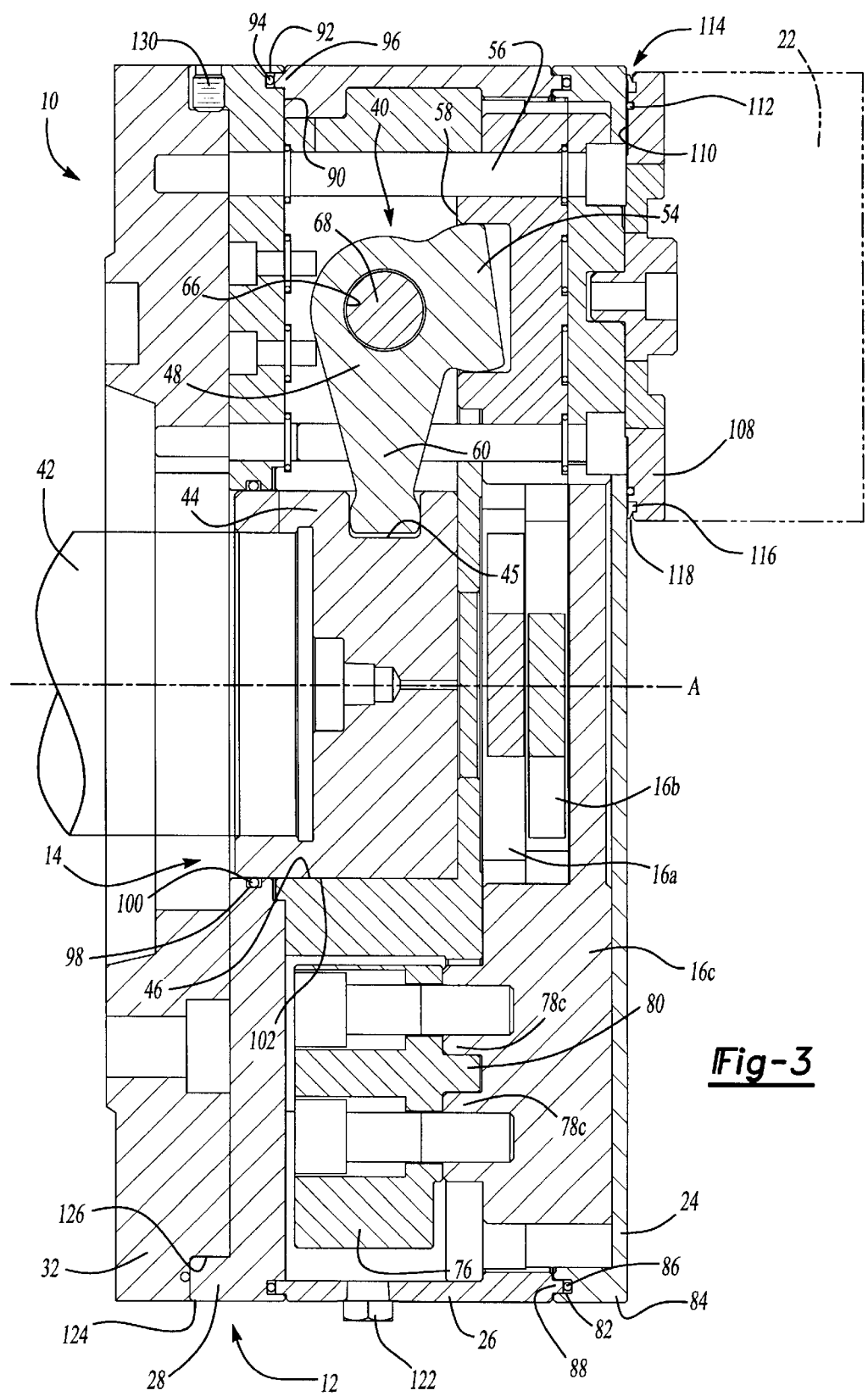
FIG. 3 is a sectional elevational view taken along the line III—III of FIG. 2.

The front cover plate 24 has a plurality of radially extending slots 104 formed therethrough which provide access to the forward face 106 of the jaw support portions 70. A slide cover 108 is disposed over the slots 104 to maintain the oil tight seal in the housing subassembly 12, while at the same time allowing the gripping jaws 22 to be releasably secured to the jaw support portion 70. Slide cover 108 is generally rectangular shaped and is releasably secured to the jaw support plate 70 of the master slide 16 by threaded fasteners or other suitable means. The rearward surface 110 of the slide cover 108 has a pair of seals 112, 114 which engage the forward face 106 of the jaw support plate 70 to maintain the lubricant-tight seal. Seal 112 is an O-ring pressed into a groove having a rectangular configuration in true view (as shown in FIG. 2). Seal 114 also has a rectangular configuration in true view (as shown in FIG. 2) and forms a wiper seal having a bead portion 116 and a skirt 118 (as shown in FIG. 3) extending therefrom which functions to prevent leakage of any lubricant from slide cover 108 and wipe lubricant towards slot 104.

With particular reference now to FIG. 2, the housing subassembly 12 is provided with means for filling and draining lubricant from the interior volume 30 without disassembling the chuck assembly 10. Specifically, the cover plate 24 has a threaded aperture formed therethrough which is adapted to receive an oil fill plug 120. Similarly, the outer ring 26 has a threaded aperture formed therein which is adapted to receive an oil drain plug 122 to permit the draining of lubricant from the sliding jaw chuck assembly 10.

With reference now to FIG. 2, the sliding jaw chuck 10 includes means for adjusting the concentricity of the machine adapter plate 32 with respect to the remaining components of the sliding jaw chuck 10. Rear cover plate 28 has a rearward projecting flange 124 which is received within a relief 126 formed in machine adapter plate 32. A slight radial clearance is provided between the rear cover plate 28 and the machine adapter plate 32. A plurality of adjusting screws 130 extend through flange 124 at equally spaced interval and function to concentrically located the rear cover plate 28 on the machine adapter plate. As presently preferred, four adjusting screws are equally spaced about the circumference of the rear cover plate 28. However, one skilled in the art would readily recognize that fewer or more adjusting screws could be used as dictated by a particular application.

With reference now to the drawings, the operation of the sliding jaw chuck assembly 10 in an OD chucking application will now be described. The machine adapter plate 32 is configured for a specific machining apparatus such that the draw bar 42 of such machining apparatus may be secured to the draw spool 44. Once the sliding jaw chuck assembly 10 is properly secured to the machining apparatus, the housing subassembly 12 is be gauged to ensure that the chuck assembly 10 is concentrically located on the machining apparatus. For this purpose, the adjustment screws 130 are positioned until the center of rotation for the sliding jaw chuck assembly 10 coincides with the center of rotation for the machining apparatus.

Once properly centered, the draw bar 42 may be actuated with respect to the sliding jaw chuck assembly 19 so as to axially position the draw spool 44. Such movement of the draw spool 44 pivots the levers 48 about the fixture pin 68 causing the axial leg 54 to radially position the master slides 16. Such movement of the master slides generate a clamping force between the gripping jaws 22 for adequately securing a workpiece to the sliding jaw chuck assembly 10. With the workpiece adequately secured, the sliding jaw chuck assembly 10 may be rotated to perform the desired machining operation on the workpiece.

By properly balancing the jaw support portion 70 and the gripping jaws 22 with the counterweight support plate 72 and the counterweight 76, a centrifugal force balance is achieved such that the clamping force generated by the sliding jaw chuck assembly 10 is maintained independent of the rotational speed at which the sliding jaw chuck assembly 10 is operated. Once machining of the workpiece is completed, the draw spool 42 is urged forward such that the draw spool 44 also moves forward causing the levers 48 to rotate about the fixture pin 68. Such movement pushes the master slides 16 radially outwardly and disengages the workpiece from the gripping jaws.

While the operation of sliding jaw chuck assembly 10 has been heretofore described with respect to an OD chucking application, one skilled in the art will recognize that the present invention is also suitable for ID chucking applications. The invention provides a relatively inexpensive and relatively easy means by which high performance, precision sliding jaw chuck assemblies can be adapted for use in high speed applications without adversely affecting the clamping force generated thereby. Furthermore, the present invention provides a sealed enclosure for the sliding jaw subassembly which may be immersed in a suitable lubricant rendering the assembly self-lubricating. In this manner, the moving components of the sliding jaw chuck assembly are adequately lubricated while at the same time protected from the machining environment, thereby reducing the maintenance and wear of the assembly.

Having described a preferred embodiment of the present invention, one skilled in the art will readily recognize that other embodiment of the present invention can be developed within the framework of the disclosure and such embodiments are to be considered within the scope and spirit of the present invention. As such, those skilled in the art will readily recognized from the foregoing discussion and the accompanying drawings and claims, that changes, modifications and variations can be made in the present invention without departing from the spirit and scope thereof as defined in the following claims:

What is claimed is:

1. A sliding jaw chuck assembly comprising:
    a sliding jaw subassembly including:
        a body having a central longitudinal axis;
        a plurality of slides supported for radial motion on said body, each of said slides having a jaw member, a bridge extending from said jaw member through said central longitudinal axis of said body and a counterweight disposed on an end of said bridge opposite said jaw member;
        a draw spool supported for axial motion in said body;
        an actuation mechanism operably coupling said draw spool and said plurality of slides, wherein axial motion of said draw spool generates sliding motion of said plurality of slides such that said jaw members are moveable between an open position and an closed position; and
        a chuck housing enclosing said sliding jaw subassembly, said chuck housing including a front face having a plurality of radial slots formed therein such that a corresponding jaw member extends therethrough, and a rear face having an opening formed therein such that said draw spool extends into said opening.

2. A sliding jaw chuck assembly comprising:
    a sliding jaw subassembly including:
        a body having a central longitudinal axis;
        a plurality of slides supported for radial motion on said body, each of said slides having a jaw member, a bridge extending from said jaw member through said central longitudinal axis of said body and a counterweight disposed on an end of said bridge opposite said jaw member;
        a draw spool supported for axial motion in said body;
        an actuation mechanism operably coupling said draw spool and said plurality of slides, wherein axial motion of said draw spool generates sliding motion of said plurality of slides such that said jaw members are moveable between an open position and an closed position; and
        a chuck housing enclosing said sliding jaw subassembly, said chuck housing including a front face having a plurality of radial slots formed therein such that a corresponding jaw member extends therethrough, a rear face having an opening formed therein such that said draw spool extends into said opening, and an adapter plate releasably secured to said rear face of said chuck housing, said adapter plate being configured for a specific machining apparatus.

3. The sliding jaw chuck assembly of claim 1 wherein said actuation mechanism comprises a lever associated with each of said plurality of slides, said lever being pivotally coupled to said body and having a first leg engaging said draw spool and a second leg engaging said slide.

4. The sliding jaw chuck assembly of claim 3 wherein said actuation mechanism further comprises a fixture pin extending through said body for pivotally coupling said lever to said body.

5. The sliding jaw chuck assembly of claim 3 wherein said draw spool has a slot formed therein for receiving a portion of said first leg of said lever.

6. The sliding jaw chuck assembly of claim 3 wherein said jaw member has a pocket formed therein for receiving a portion of said second leg of said lever.

7. A sliding jaw chuck assembly comprising:
    a sliding jaw subassembly including:
        a body having a central longitudinal axis;
        a plurality of slides supported for radial motion on said body, each of said slides having a jaw member, a bridge extending from said jaw member through said central longitudinal axis of said body and a counterweight disposed on an end of said bridge opposite said jaw member;
        a draw spool supported for axial motion in said body;
        an actuation mechanism operably coupling said draw spool and said plurality of slides, wherein axial motion of said draw spool generates sliding motion of said plurality of slides such that said jaw members are moveable between an open position and an closed position; and
        a chuck housing defining a sealed interior volume enclosing said sliding jaw subassembly therein, said chuck housing including a front face having a plurality of radial slots formed therein such that a corresponding jaw member extends therethrough, and a rear face having an opening formed therein such that said draw spool extends into said opening.

8. The sliding jaw chuck assembly of claim 7 wherein said interior volume is at least partially filled with a lubricant.

9. The sliding jaw chuck assembly of claim 8 further comprising a plurality of slide covers, each of said plurality of slide covers being seated on said front face of said chuck housing over one of said plurality of said radial slots and coupled to said jaw member for coordinated movement therewith.

10. The sliding jaw chuck assembly of claim 9 further comprising a seal member interdisposed between each of said plurality of slide covers and said front face.

11. The sliding jaw chuck assembly of claim 8 further comprising a seal interdisposed between said draw spool and said rear face.

12. The sliding jaw chuck assembly of claim 8 wherein said chuck housing has an oil drain plug disposed in an oil drain hole and an oil fill plug disposed in an oil fill hole.

13. A sliding jaw chuck assembly comprising:
a sliding jaw subassembly including:
a body having a central longitudinal axis;
a plurality of slides supported for radial motion on said body, each of said slides having a jaw member, a bridge extending from said jaw member through said central longitudinal axis of said body and a counterweight disposed on an end of said bridge opposite said jaw member, wherein said bridge of each of said plurality of slides are interconnected to said jaw member and said counterweight in an axially offset manner and arranged in a stacked relationship through said central longitudinal axis;
a draw spool supported for axial motion in said body;
an actuation mechanism operably coupling said draw spool and said plurality of slides, wherein axial motion of said draw spool generates sliding motion of said plurality of slides such that said jaw members are moveable between an open position and an closed position; and
a chuck housing enclosing said sliding jaw subassembly, said chuck housing including a front face having a plurality of radial slots formed therein such that a corresponding jaw member extends therethrough, and a rear face having an opening formed therein such that said draw spool extends into said opening.

14. The sliding jaw chuck assembly of claim 2 further comprising a plurality of adjustment members interdisposed between said chuck housing and said adapter plate to align a central longitudinal axis of said adapter plate with said central longitudinal axis of said chuck housing.

15. A sliding jaw chuck assembly comprising:
a body having a throughbore formed a long a central longitudinal axis, a plurality of radially extending slots formed in a front face of said body, and a plurality of trunnions formed on a rear face of said body;
a plurality of slides disposed in said plurality of radially extending slots, each of said plurality of slides having a jaw support portion, a bridge extending from said jaw support portion through said central longitudinal axis of said body, a counterweight support portion disposed on an end of said bridge opposite said jaw support portion, and a counterweight releasably secured to said counterweight support portion of said slide;
a draw spool disposed in said throughbore and supported therein for axial sliding motion;
a plurality of actuation mechanisms operably coupling said draw spool and said plurality of slides, each of said plurality of actuation mechanism including a lever supported for pivotal movement in one of said plurality of trunnions, said lever having a radial leg engaging said draw spool and an axial leg engaging one of said plurality of slides, wherein axial sliding motion of said draw spool generates radial sliding motion of said plurality slides;
a chuck housing including a front plate having a plurality of radial slots formed therein such that said jaw support portion extends through said radial slot, an annular ring extending rearwardly from said front plate and supporting said body, and a rear plate having an opening formed therein such that said draw spool extends into said opening; and
a plurality of slide covers, each of said plurality of slide covers being seated on a front face of said front plate over one of said plurality of said radial slots and coupled to said jaw support portion for coordinated movement therewith between an open position and a closed position.

16. The sliding jaw chuck assembly of claim 15 wherein said bridge of each of said plurality of slides is interconnected to said jaw member and said counterweight in an axially offset manner, said plurality of slides being positioned in said body such that said bridges are arranged in a stacked relationship through said central longitudinal axis.

17. The sliding jaw chuck assembly of claim 14 wherein said chuck housing defines a sealed interior volume enclosing said sliding jaw subassembly therein.

18. The sliding jaw chuck assembly of claim 17 wherein said interior volume is at least partially filled with a lubricant.

19. The sliding jaw chuck assembly of claim 18 further comprising a seal member interdisposed between each of said plurality of slide covers and a front face of said front plate.

20. The sliding jaw chuck assembly of claim 18 further comprising a seal interdisposed between said draw spool and said rear plate.

21. The sliding jaw chuck assembly of claim 18 wherein said chuck housing has an oil drain plug disposed in an oil drain hole and an oil fill plug disposed in an oil fill hole.

22. The sliding jaw chuck assembly of claim 15 further comprising an adapter plate releasably secured to a rear face of said rear plate, said adapter plate being configured for a specific machining apparatus.

23. The sliding jaw chuck assembly of claim 22 further comprising a plurality of adjustment members interdisposed between said rear plate and said adapter plate to align a central longitudinal axis of said adapter plate with said central longitudinal axis of said chuck housing.

* * * * *

UNITED STATES PATENT AND TRADEMARK OFFICE
CERTIFICATE OF CORRECTION

PATENT NO. : 6,425,584 B1
DATED : July 30, 2002
INVENTOR(S) : William R. Stickney It is certified that error appears in the above-identified patent and that said Letters Patent is hereby corrected as shown below:

Column 4,
Line 48, "interval" should be -- intervals --.
Line 48, "located" should be -- locate --.
Line 62, delete "be".

Column 5,
Line 42, "embodiment" should be -- embodiments --.
Line 48, "recognized" should be -- recognize --.

Column 6,
Line 22, "an" should be -- a --.
Line 63, "an" should be -- a --.

Column 7,
Line 40, "an" should be -- a --.
Line 55, "a long" should be -- along --.

Signed and Sealed this

Eleventh Day of February, 2003

JAMES E. ROGAN
*Director of the United States Patent and Trademark Office*